United States Patent
Lin et al.

(10) Patent No.: US 9,229,578 B2
(45) Date of Patent: Jan. 5, 2016

(54) IMAGE SENSOR AND OPTICAL TOUCH SYSTEM INCLUDING THE SAME

(75) Inventors: Chih Hsin Lin, Hsinchu (TW); Tzung Min Su, Hsinchu (TW); Ming Tsan Kao, Hsinchu (TW)

(73) Assignee: Pixart Imaging Inc., Hsin-Chu (TW)

( * ) Notice: Subject to any disclaimer, the term of this patent is extended or adjusted under 35 U.S.C. 154(b) by 636 days.

(21) Appl. No.: 13/565,358

(22) Filed: Aug. 2, 2012

(65) Prior Publication Data

US 2013/0033457 A1    Feb. 7, 2013

(30) Foreign Application Priority Data

Aug. 5, 2011 (TW) .............................. 100127925 A (51) Int. Cl.
*G06F 3/042* (2006.01)
*G06F 3/041* (2006.01)

(52) U.S. Cl.
CPC .............. G06F 3/042 (2013.01); G06F 3/0416 (2013.01)

(58) Field of Classification Search
CPC ........... G06G 3/042; G09G 5/00; H04N 7/17; H05B 37/02
See application file for complete search history.

(56) References Cited

U.S. PATENT DOCUMENTS

| 4,782,328 A | 11/1988 | Denlinger |
| 7,689,381 B2 | 3/2010 | Lin et al. |
| 2010/0225617 A1* | 9/2010 | Yoshimoto et al. ........... 345/175 |

FOREIGN PATENT DOCUMENTS

CN            101825462 A        9/2010

OTHER PUBLICATIONS

Office Action from the People's Republic of China State Intellectual Property Office in the corresponding Chinese application 201210282184.6 dated Mar. 26, 2015, 8 pp.

* cited by examiner

*Primary Examiner* — Tony N Ngo
(74) *Attorney, Agent, or Firm* — Juan Carlos A. Marquez; Bacon & Thomas PLLC (57) ABSTRACT

An image sensor includes a plurality of light detecting elements. The plurality of light detecting elements are arranged in a plurality of rows and a plurality of columns, wherein a flat field picture generated by the image sensor, the intensity standard deviation of pixels in each pixel column is greater than that of pixels in any pixel row, or the intensity standard deviation of pixels in each pixel row is greater than that of pixels of any pixel column.

22 Claims, 12 Drawing Sheets

FIG. 12

IMAGE SENSOR AND OPTICAL TOUCH SYSTEM INCLUDING THE SAME

CROSS-REFERENCE TO RELATED APPLICATION

The present application is based on, and claims priority from, Taiwan Patent Application Serial Number 100127925, filed on Aug. 5, 2011, the disclosure of which is herein incorporated by reference in its entirety.

BACKGROUND

1. Technical Field

The present invention relates to an image sensor and an optical touch system comprising the same.

2. Related Art

In an optical touch screen system, the method of calculating the position of an object is to use an image sensor to generate a picture, analyzing the location of an object image in the picture, calculating the coordinates of the object according to the location of the object image in the picture and a portion of geometric dimensions of the optical touch screen system.

U.S. Pat. No. 4,782,328 discloses an optical touch screen system, which comprises two image sensors configured to capture the image of an object on a touch screen. A processor is coupled with the two image sensors for processing the images from the two image sensors in order to decide sensing paths respectively connecting the object and the two image sensors, and further calculates the coordinates of the object using the sensing paths.

U.S. Pat. No. 7,689,381 B2 discloses another optical touch screen system, which comprises a mirror, two light sources, an image sensor, and a processor. The mirror and the two light sources are disposed at the border of a touch area. The mirror can generate a reflection of an object. The image sensor can capture an image of the object and an image of the reflection. The processor can determine sensing paths passing through the image of the object and the image of the reflection, and then determine the coordinates of the object by the two sensing paths.

Usually, in an optical touch screen system, it is difficult to have uniform background light. In order to precisely determine an object image, the influence of non-uniform background illumination has to be eliminated before the analysis of the object image. A general method is to store a to background picture in advance, subtracting the background picture from a captured picture, and then lastly analyzing the subtracted picture to determine the object image. To perform the aforementioned method, an optical touch screen system always has to store a background picture, which needs a large memory space for storage. Further, the background illumination may change so that the background picture has to be frequently updated, which increases the operation loadings on the optical touch screen system. In addition, the computing procedures of subtracting a background picture from a picture, analyzing the boundary positions of the object image in the subtracted picture, and calculating the coordinates of the object according to the boundary positions consumes a large amount of electrical energy. Furthermore, the optical touch screen system needs a faster clock to be more responsive.

SUMMARY

One embodiment of the present invention provides an optical touch system that need not store a background picture for analyzing an object image.

One embodiment of the present invention provides an optical touch system that needs not a background picture to analyze an object image.

One embodiment of the present invention provides an optical touch system that can use a lower clock for operation.

One embodiment of the present invention determines an object image by analysis of the standard deviations of a picture.

One embodiment of the present invention discloses an image sensor that comprises a plurality of light detecting elements. The light detecting elements may be arranged in a plurality of rows and a plurality of columns. The image sensor may generate a flat field picture that comprises a plurality of pixel rows and a plurality of pixel columns. In the flat field picture, an intensity standard deviation of pixels in each pixel column is greater than an intensity standard deviation of pixels in any pixel row, or an intensity standard deviation of pixels in each row is greater than an intensity standard deviation of pixels in any pixel column.

Another embodiment of the present invention discloses an image sensor that comprises a plurality of light detecting elements. The light detecting elements may be arranged in a plurality of rows and a plurality of columns. Each column or row comprises two groups of light detecting elements having different photosensitive parameters.

One embodiment of the present invention discloses an optical touch system that comprises a touch surface and an image sensor. The image sensor is configured to capture an image of an object on the touch surface for calculating coordinate data of the object. The image sensor comprises a plurality of light detecting elements that can be arranged in a plurality of rows and a plurality of columns. An intensity standard deviation of pixels in at least one pixel column or row of a picture generated by the image sensor and comprising the image of the object is less than that of pixels in at least one pixel column or row of another picture that does not comprise the image of the object.

Another embodiment of the present invention discloses an optical touch system that comprises a touch surface, an image sensor, and a computing device. The image sensor is configured to capture an image of an object on the touch surface. The image sensor comprises a plurality of light detecting elements arranged in a plurality of rows and a plurality of columns. Each light detecting element generates a signal. The computing device is configured to determine at least one column of light detecting elements from a projected area of the image, wherein the signals generated by the at least one column of light detecting elements are less than a threshold value.

To provide a better understanding of the above-described objectives, to characteristics and advantages of the present invention, a detailed explanation is provided in the following embodiments with reference to the drawings.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1:
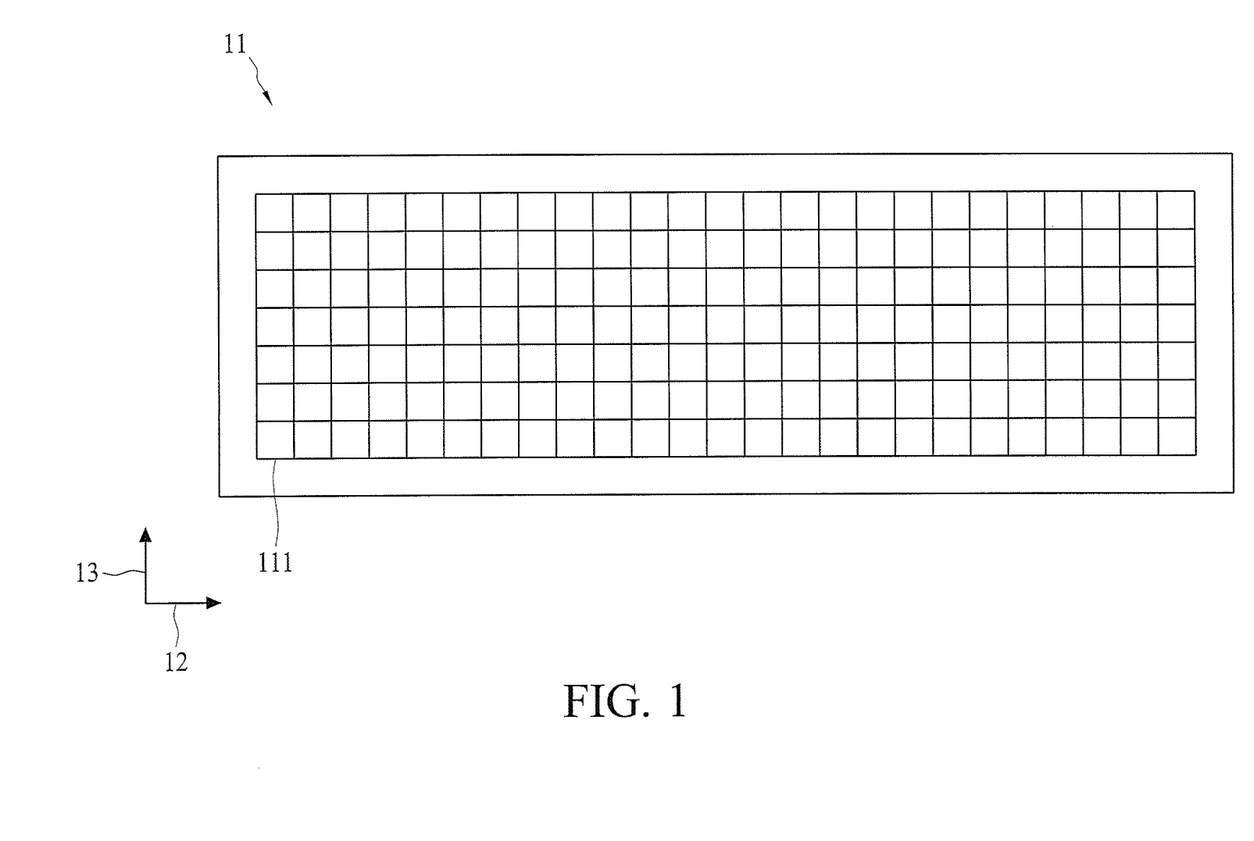
FIG. 1 is an illustration schematically depicting an image sensor according one embodiment of the present invention.

FIG. 1 is an illustration schematically depicting an image sensor 11 according one embodiment of the present invention. As shown in FIG. 1, the image sensor 11 comprises a plurality of light detecting elements 111. The light detecting elements 111 can be arranged along row directions 12 and column directions 13, forming a plurality of rows of light detecting elements 111 and a plurality of columns of light detecting elements 111. The light detecting element 111 can generate a signal when it is illuminated by light. The image sensor 11 is configured to have a portion of light detecting elements 111 and another portion of light detecting elements 111 generating obviously different numbers of electrons when the image sensor 11 is forming a flat field picture of a region exposed to uniform illumination. The number difference between the electrons that the two portions generate is greater than the number of electrons causing noises. Because the two portions of light detecting elements 111 can generate obviously different numbers of electrons, signals corresponding to the two portions of light detecting elements 111 are also obviously different so that the flat field picture formed by the different signals may have obviously low and high intensity values distributed throughout the picture. As such, the intensity standard deviation of the flat field picture is high. When the two portions of light detecting elements 111 are covered for generating a dark picture, the two portions of light detecting elements 111 generate electrons that are not significantly different in number, and the difference may be not be greater than the number of electrons causing noises. As a result, the dark picture generated by the image sensor 11 will not have a high intensity standard deviation.

In some embodiments of the present invention, each pixel of the picture generated by the image sensor 11 is a weighted mean of the signals of a plurality of light detecting elements 111 or can be determined by other averaging methods. The determination of an object image can be performed by analyzing the distribution of electronic signals from the light detecting elements 111 to distinguish the object image from the background or performed by analyzing the distribution of low and high intensity values of the picture. In other embodiments, the signals generated by the light detecting elements 111 can be pre-treated, and an analysis is then applied to the pre-treated signals to distinguish the object image from the background.

Figure 2:
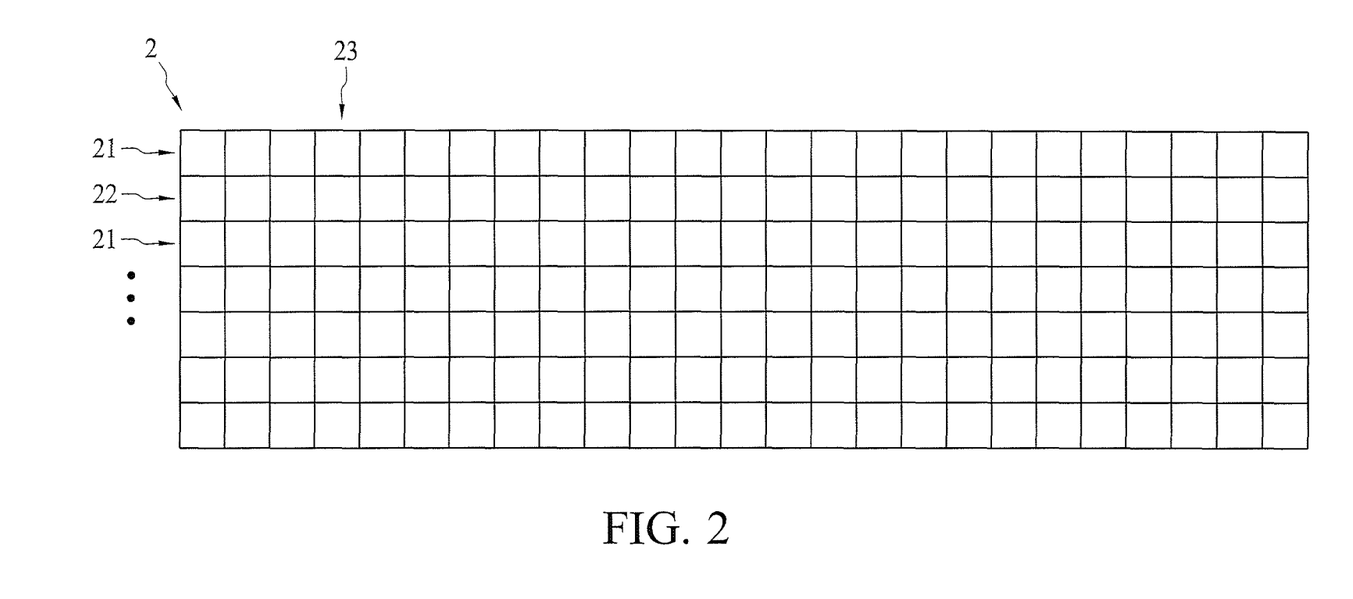
FIG. 2 is an illustration schematically depicting a flat field picture generated by an image sensor according to one embodiment of the present invention.
Figure 3:
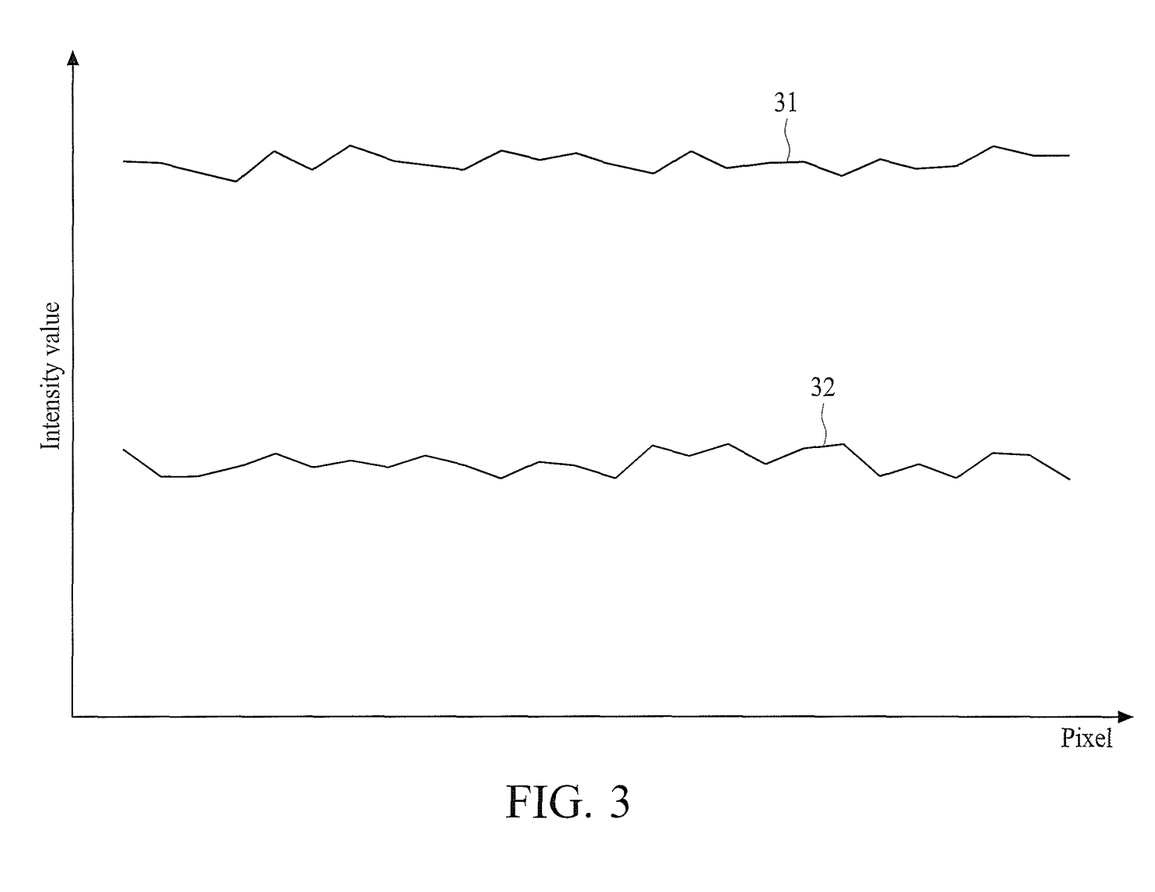
FIG. 3 schematically depicts the intensity values of the pixels of two pixel rows of a flat field picture according to one embodiment of the present invention.

FIG. 2 is an illustration schematically depicting a flat field picture 2 generated by an image sensor 11 according to one embodiment of the present invention. FIG. 3 schematically depicts the intensity values of the pixels of two pixel rows 21 and 22 of a flat field picture 2 according to one embodiment of the present invention. Referring to FIGS. 1 through 3, in one embodiment of the present invention, the image sensor 11 generates a flat field picture 2. The flat field picture 2 may comprise a plurality of first pixel rows 21 and at least one second pixel row 22, in which the intensity values 31 of the pixels of the first pixel row 21 are higher than the intensity values 32 of the pixels of at least one second pixel row 22.

Figure 4:
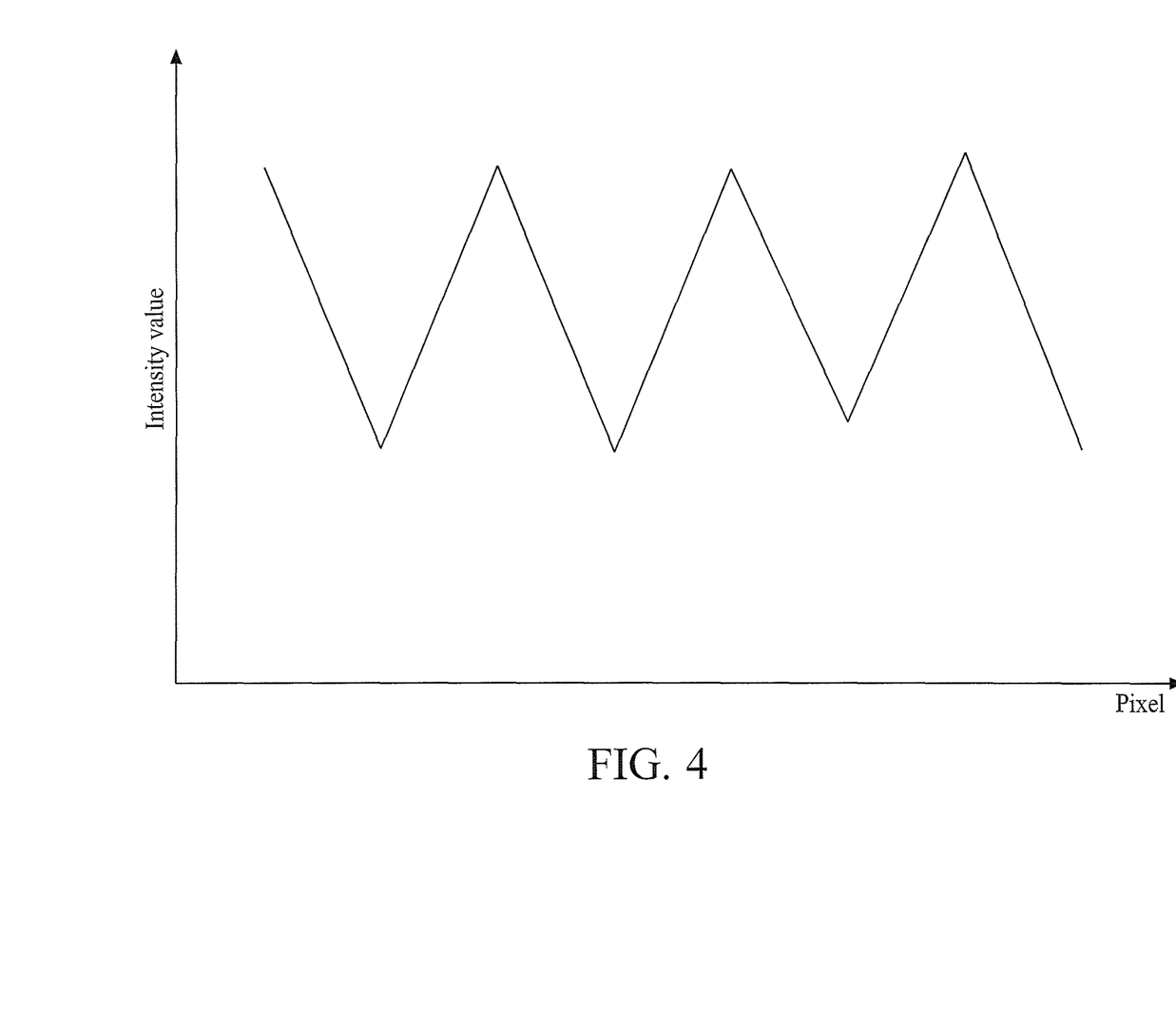
FIG. 4 schematically depicts the intensity values of the pixels of one pixel column of a flat field picture generated by an image sensor according to one embodiment of the present invention.

FIG. 4 schematically depicts the intensity values of the pixels of one pixel column 23 of a flat field picture 2 generated by an image sensor 11 according to one embodiment of the present invention. Referring to FIGS. 2 and 4, in one embodiment, the flat field picture 2 comprises a plurality of first pixel rows 21 and a plurality of second pixel rows 22, wherein the intensity values 31 of the pixels of the first pixel row 21 are higher than the intensity values 32 of the pixels of the second pixel row 22. The plurality of first pixel rows 21 and the plurality of second pixel rows 22 are alternatively arranged such that the intensity values of the pixels of each pixel column 23 form a zigzag pattern as shown in FIG. 4.

In one embodiment of the present invention, the number of the first pixel rows 21 can be equal or unequal to the number of the second pixel rows 22. The plurality of the first pixel rows 21 and the plurality of second pixel rows 22 are alternatively arranged.

In one embodiment, the plurality of first pixel rows 21 can be arranged adjacent to each other, and the plurality of second pixel rows 22 can be arranged adjacent to each other.

Figure 5:
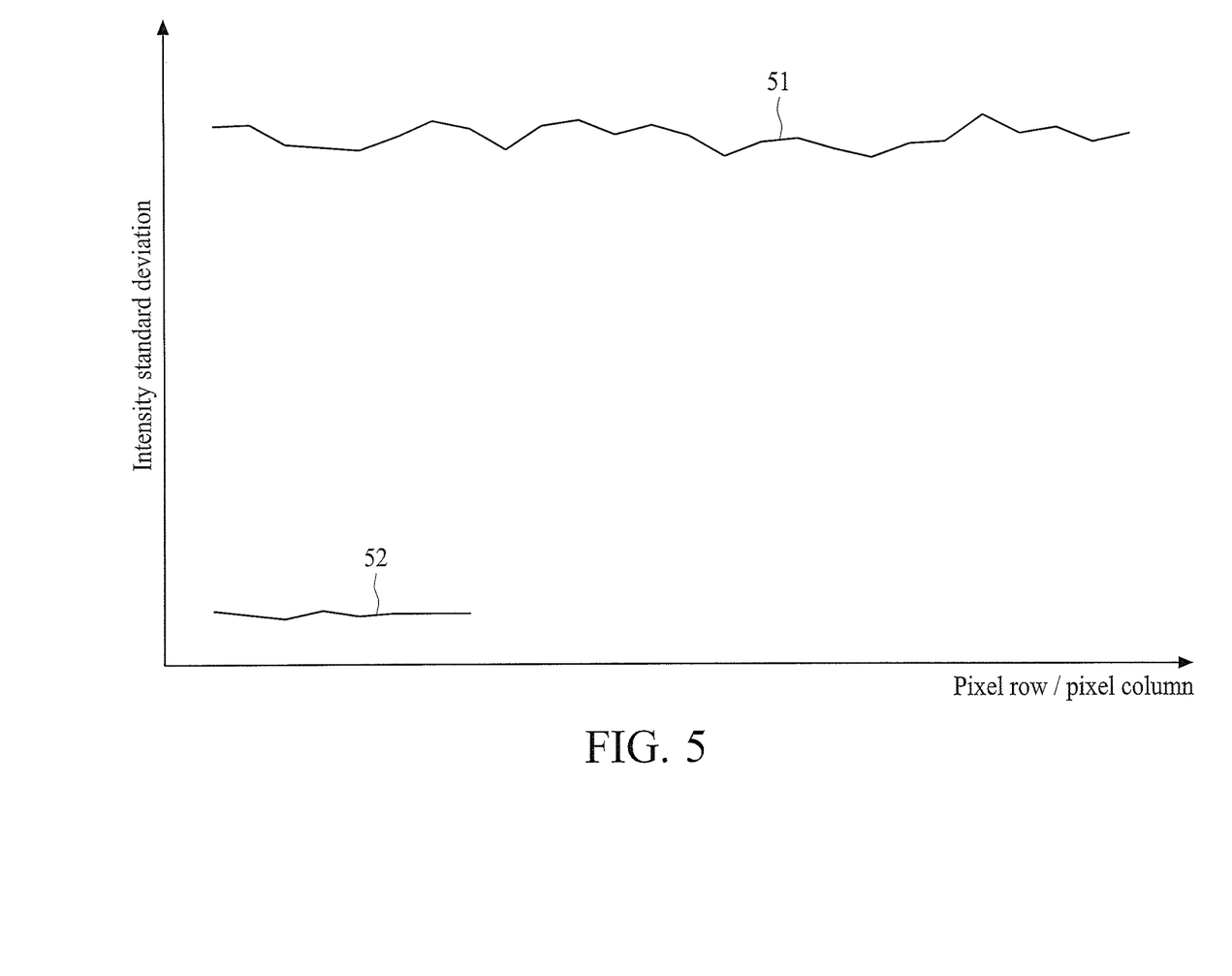
FIG. 5 schematically depicts the intensity standard deviations of the pixels of a plurality of pixel columns and the intensity standard deviations of the pixels of a plurality of rows according to one embodiment of the present invention.

FIG. 5 schematically depicts the intensity standard deviations of the pixels of a plurality of pixel columns 23 and the intensity standard deviations of the pixels of a plurality of rows 21 and 22 according to one embodiment of the present invention. In FIGS. 2 to 5, each column of light detecting elements 111 comprises two groups of light detecting elements 111 that can generate obviously different numbers of electrons when the image sensor captures the image of a region exposed to uniform illumination. As a result, the intensities of the pixels of each pixel column 23 varies significantly in the flat field picture 2, and will result in a large intensity standard deviation 51. When the image sensor captures the image of a region exposed to uniform illumination, the light detecting elements 111 in each row generates electrons that are insignificantly different in numbers. As shown in the flat field picture 2, the intensity standard deviations of the pixel rows 22 are smaller, as indicated by number 52.

In the above embodiments, the light detecting elements 111 of each column of the image sensor 11 comprises two groups of light detecting elements 111 that can generate obviously different numbers of electrons, and the light detecting elements 111 of each row of the image sensor 11 generate insignificantly different numbers of electrons; however, the present invention is not limited to such a design. In other embodiments of the present invention, the light detecting elements of each row of the image sensor comprises two groups of light detecting elements that can generate obviously different numbers of electrons, and the light detecting elements of each column of the image sensor can generate insignificantly different numbers of electrons.

Figure 6:
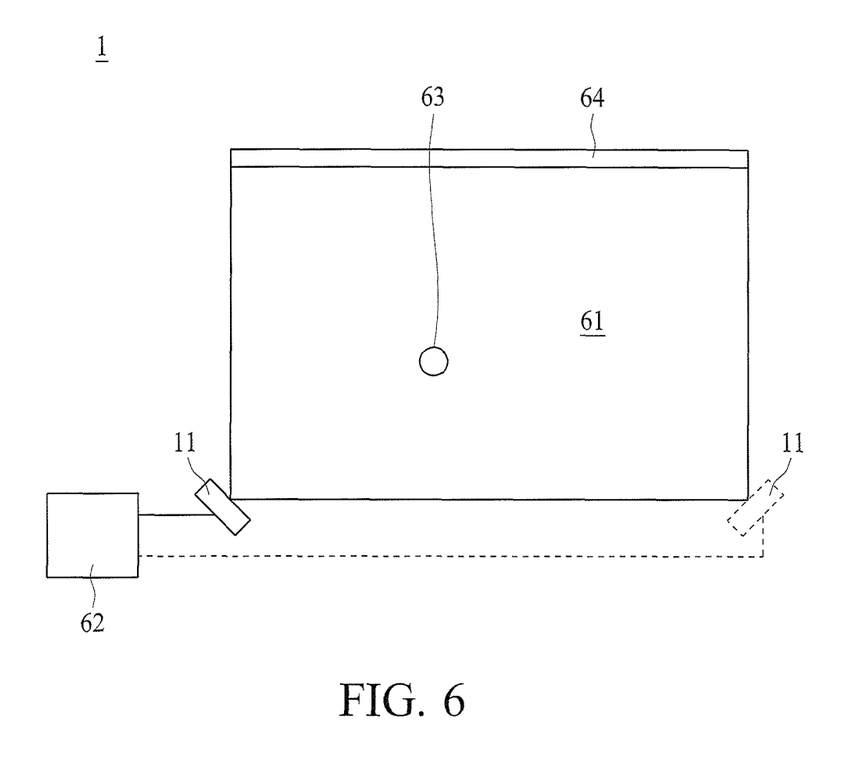
FIG. 6 is an illustration schematically depicting an optical touch system according to one embodiment of the present invention.

FIG. 6 is an illustration schematically depicting an optical touch system 1 according to one embodiment of the present invention. Referring to FIG. 6, the optical touch system 1 comprises a touch surface 61, the aforementioned image sensor 11, a computing device 62, and a light providing device 64. The image sensor 11 is configured to capture an image of an object 63 on the touch surface 61. The computing device 62 coupled with the image sensor 11 is configured for analyzing the location of the object image of the object 63 and for determining the coordinate data of the object 63. In one embodiment of the present invention, the optical touch system 1 may comprise two image sensors 11. The two image sensors 11 are configured to capture two different object images, by which the coordinates of the object 61 can be calculated. The light providing device 64 may comprise a light source. In another embodiment of the present invention, the light providing device 64 comprises a mirror, which can create a reflection of the object 63. The image sensor 11 is configured to capture the image of the object and the image of the reflection of the object, and the computing device 62 calculates the coordinates of the object 63 by the image of the object 63 and the image of the reflection of the object 63.

Figure 7:
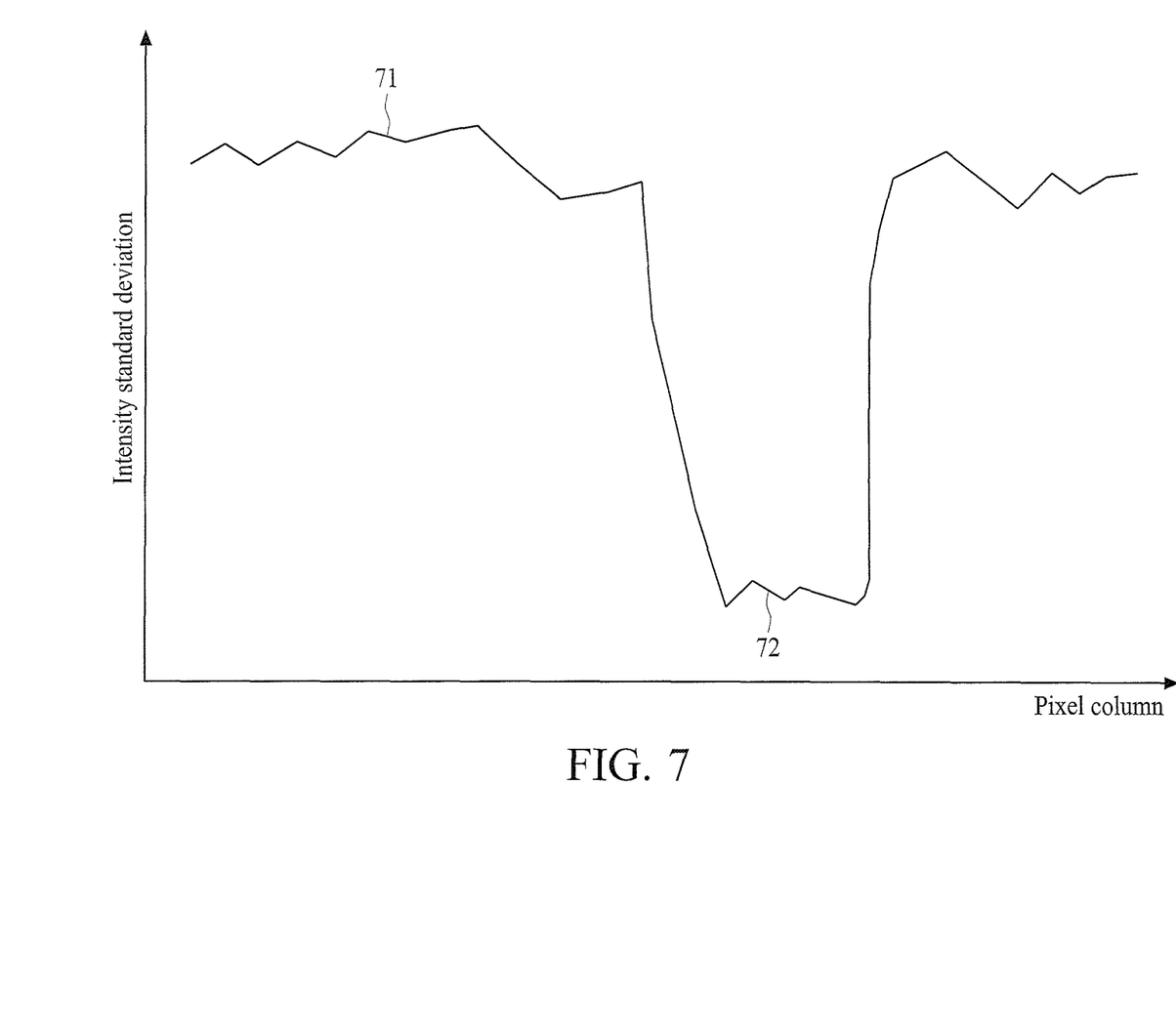
FIG. 7 is a schematic diagram showing a distribution pattern of intensity standard deviation of a picture along a column direction according to one embodiment of the present invention.

FIG. 7 is a schematic diagram showing a distribution pattern of intensity standard deviation of a picture along a column direction according to one embodiment of the present invention. Referring to FIGS. 6 and 7, when an object 63 is placed on the touch surface 61, the object 63 may block a portion of light that, emits toward the image sensor 11 such that the picture generated by the image sensor 11 may comprise a dark image created by the object 63. The computing device 62 may calculate the intensity standard deviations of a plurality of pixel columns of the generated picture. Most of the pixel columns may have high intensity standard deviations, as indicated by number 71, while another portion of pixel columns adjacent to each other may have low intensity standard deviations, as indicated by number 72, and the object image is at the position of the pixel columns as indicated by number 72. In view of the above, if the optical touch system 1 can identify the pixel columns of a newly generated picture that have low intensity standard deviations, the location of the object image in the picture can be determined.

Compared with the object image analysis method of current optical touch systems, the method of the above embodiments directly calculates intensity standard deviations of a picture, and determines an object image by identifying the distinguished portion of the intensity standard deviation distribution pattern. The method of the above embodiments need not store a background picture in advance, and therefore, memory space used to store a background picture is unnecessary. Moreover, the method of the above embodiments does not substrate a background picture from a generated picture; the method has less calculating steps, using less electrical energy to calculate the coordinate data of an object. Since there are less calculating steps, the optical touch system 1 can adopt a lower clock.

There are many methods that can be used to form a column of light detecting elements 111 including two groups of light detecting elements 111 that can generate insignificantly different numbers of electrons. Several examples are illustrated below; however the present invention is not limited to the examples. Other similar methods can be also applied to the present invention.

Figure 8:
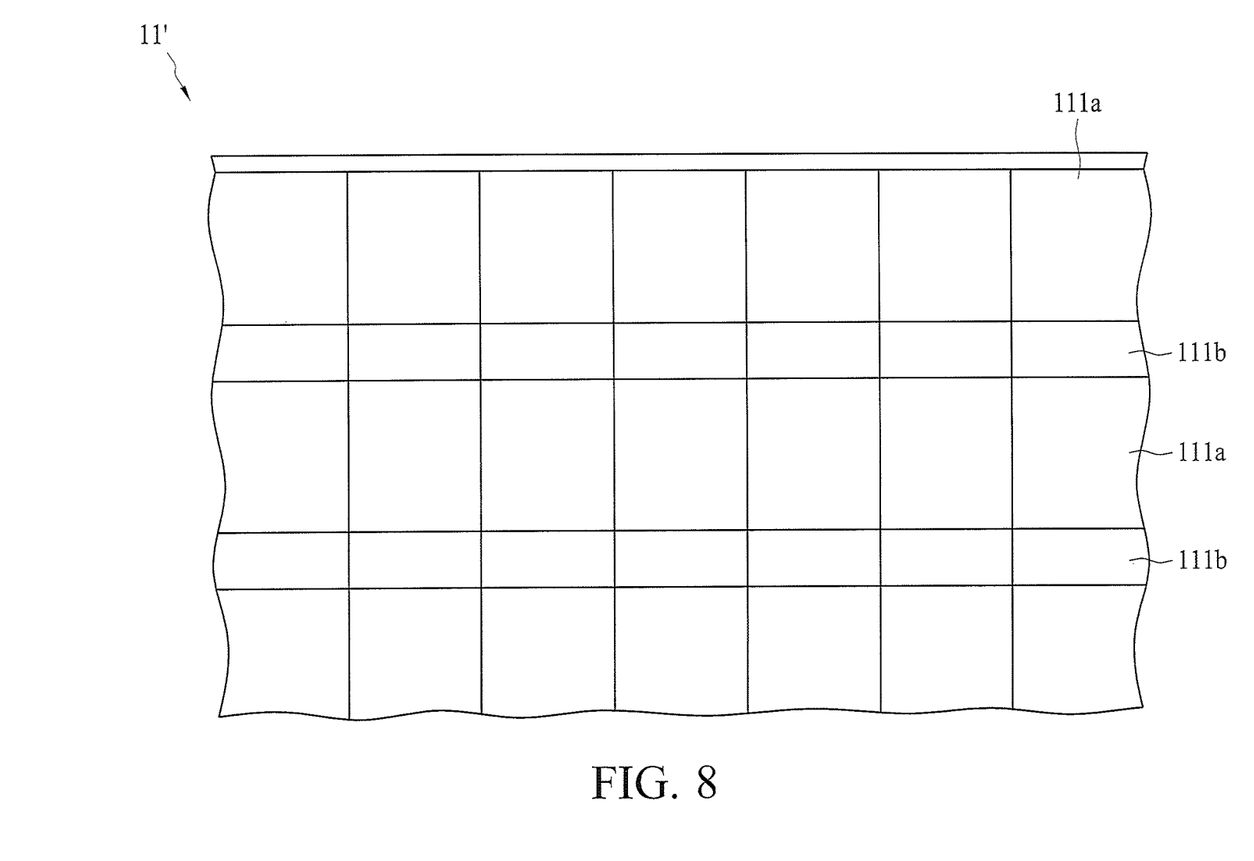
FIG. 8 schematically depicts an image sensor according to one embodiment of the present invention.

FIG. 8 schematically depicts an image sensor 11' according to one embodiment of the present invention. As shown in FIG. 8, in the image sensor 11', the light detecting elements of each row have similarly effective light collecting areas, while the light detecting elements of each column comprises a plurality of light detecting elements (111a and 111b), wherein the light detecting element 111a has an effective light collecting area different from that of the light detecting element 111b. As such, under the same illumination, the number of electrons generated by the light detecting element 111a is different from the number of electrons generated by the light detecting element 111b. In one embodiment of the present invention, the light detecting elements 111a and the light detecting elements 111b are alternatively arranged. In another embodiment of the present invention, the light detecting elements of each row have two groups of light detecting elements having different effective light collecting areas, while the light detecting elements 111 of each column have similar effective light collecting areas.

Figure 9:
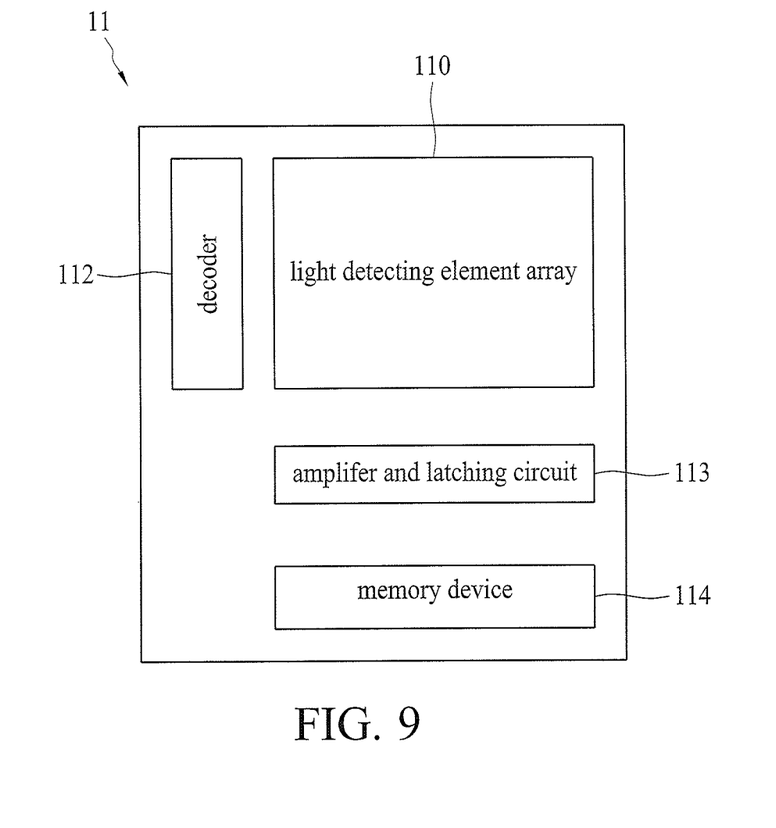
FIG. 9 is a block diagram illustrating an image sensor according to one embodiment of the present invention.

FIG. 9 is a block diagram illustrating an image sensor 11 according to one embodiment of the present invention. Referring to FIG. 9, the image sensor 11 may comprise a light detecting element array 110, a decoder 112, an amplifier and latching circuit 113 coupled with the light detecting element array 110, and a memory device 114. The light detecting element array 110 comprises a plurality of light detecting elements 110 arranged in an array. The decoder 112 and the amplifier and latching circuit 113 are coupled with the light detecting elements 110 for pixel readout operations. The memory device 114 may comprise a plurality of different exposure time values, in which each exposure time value is applied to a corresponding portion of the light detecting elements 111. As such, a flat field picture having large intensity standard deviations of pixels can be generated. In one embodiment of the present invention, the memory device 114 may comprise two different exposure time values, wherein the two different exposure time values are alternatively applied to a plurality of columns of light detecting elements. In another embodiment of the present invention, the memory device 114 stores two different exposure time values, wherein the two different exposure time values are alternatively applied to a plurality of rows of light detecting elements.

Figure 10:
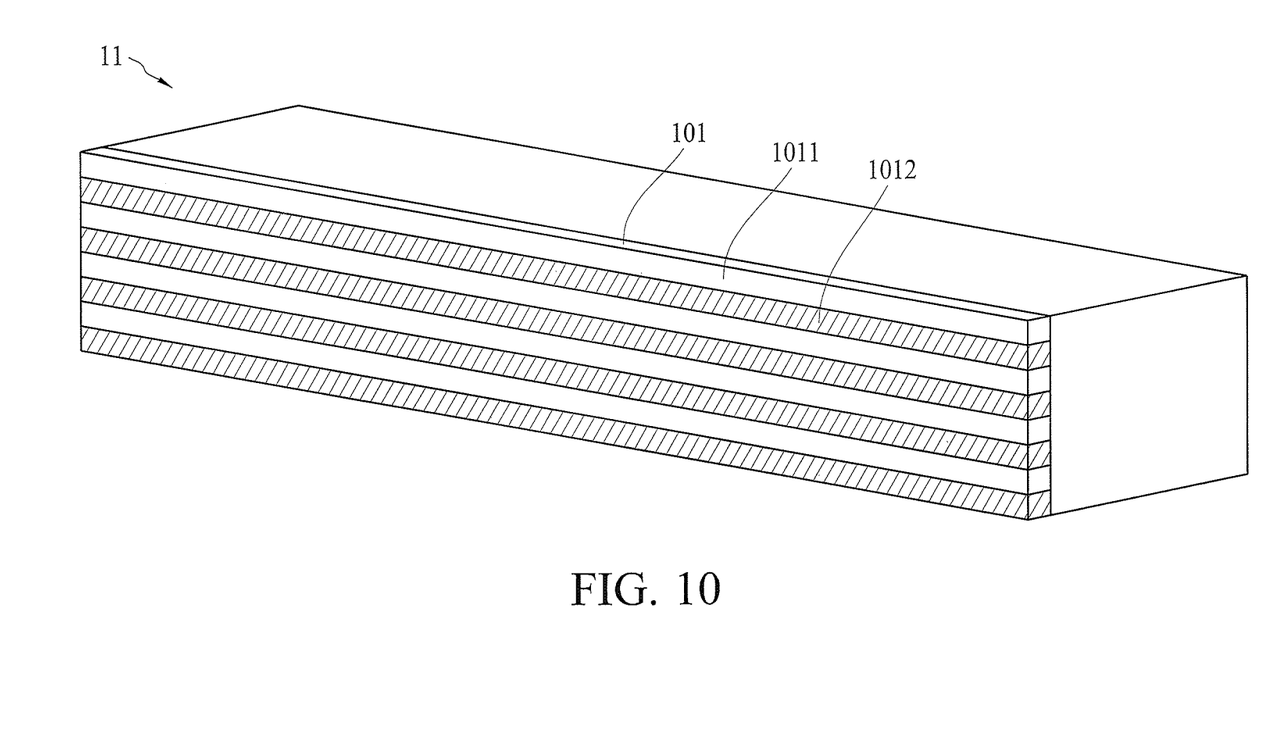
FIG. 10 is an illustration schematically depicting an image sensor and an optical component according to one embodiment of the present invention.

FIG. 10 is an illustration schematically depicting an image sensor 11 and an optical component 101 according to one embodiment of the present invention. As shown in FIG. 10, the image sensor 11 may further comprise an optical component 101, which is disposed on a light receiving surface of the image sensor 11. The optical component 101 may comprise a plurality of portions (1011 and 1012) that have different transmittance such that light arriving at the light detecting elements 111 through the optical component 101 can exhibit high intensity standard deviations. In one embodiment of the present invention, the plurality of the portions 1011 and the plurality of the portions 1012 (having transmittance different from that of the portions 1011) are alternatively arranged in a column direction. In another embodiment of the present invention, the plurality of portions 1011 and 1012 are alternatively arranged in a row direction.

In general, two factors affect the light sensitivity of an image sensor 11; one factor is the applied material (or the process technology) or the photo detector type, and another factor is the geometric arrangement of the light detecting elements and the relative position between the light detecting elements and the optical components. The variation of the former results in different quantum efficiencies; the variation of the latter results in different optical efficiencies. A flat field picture having large intensity standard deviations can be generated by adjusting the quantum efficiencies or the optical efficiencies of light detecting elements. The doped layers, the material of thin films, and the passivation layer of the image sensor 11 contribute to quantum efficiencies. When process conditions for forming is the aforementioned structures or compositions are changed, the quantum efficiencies of the light detecting elements will be changed accordingly. In one embodiment of the present invention, in the image sensor 11, the light detecting elements of each column comprise two groups of light detecting elements having different quantum efficiencies or optical efficiencies. In another embodiment of the present invention, the light detecting elements of each row comprises two groups of light detecting elements having different quantum efficiencies or optical efficiencies.

As illustrated in the embodiments of FIGS. 8 to 10, the light detecting elements of each row or column are formed to have two different photosensitive parameters such as exposure times, sensitivities, or effective light collecting areas such that the image sensor 11 can produce a flat field picture that has high intensity standard deviations, wherein the sensitivity may comprise quantum efficiency or optical efficiency.

Figure 11:
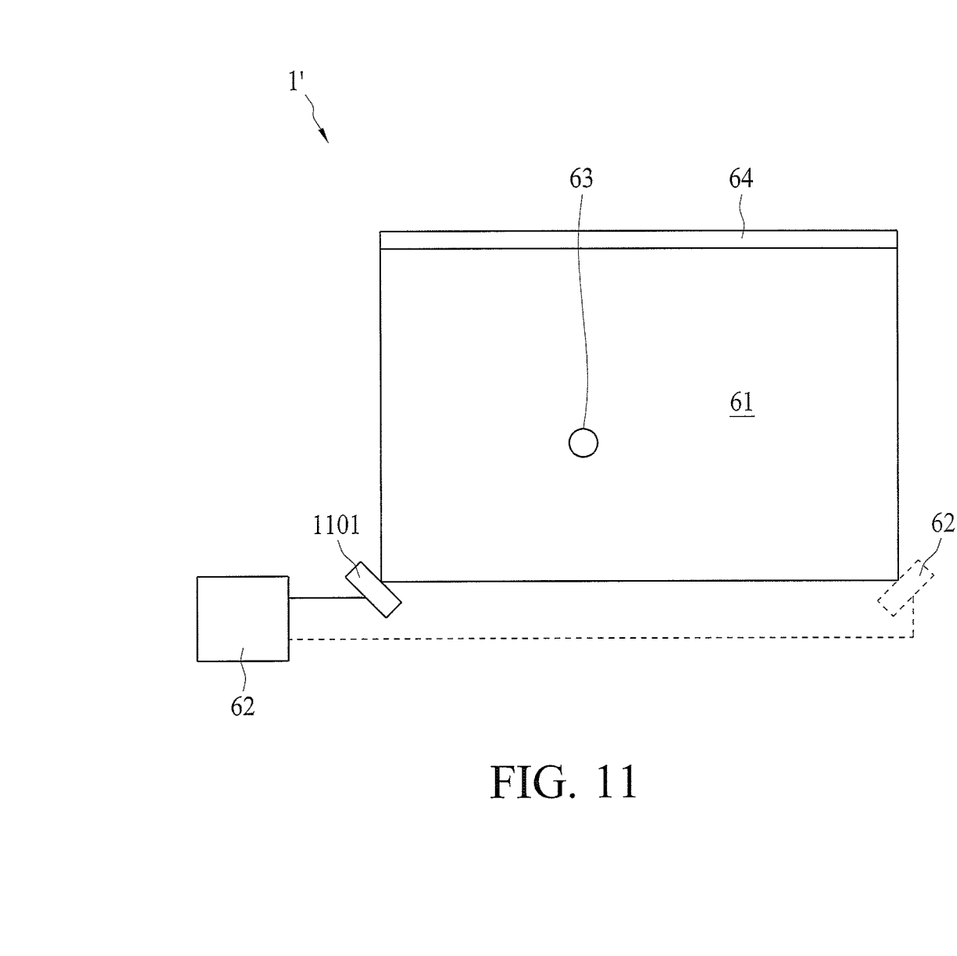
FIG. 11 is an illustration schematically depicting an optical touch system according to another embodiment of the present invention.

FIG. 11 is an illustration schematically depicting an optical touch system 1' according to another embodiment of the present invention.

Figure 12:
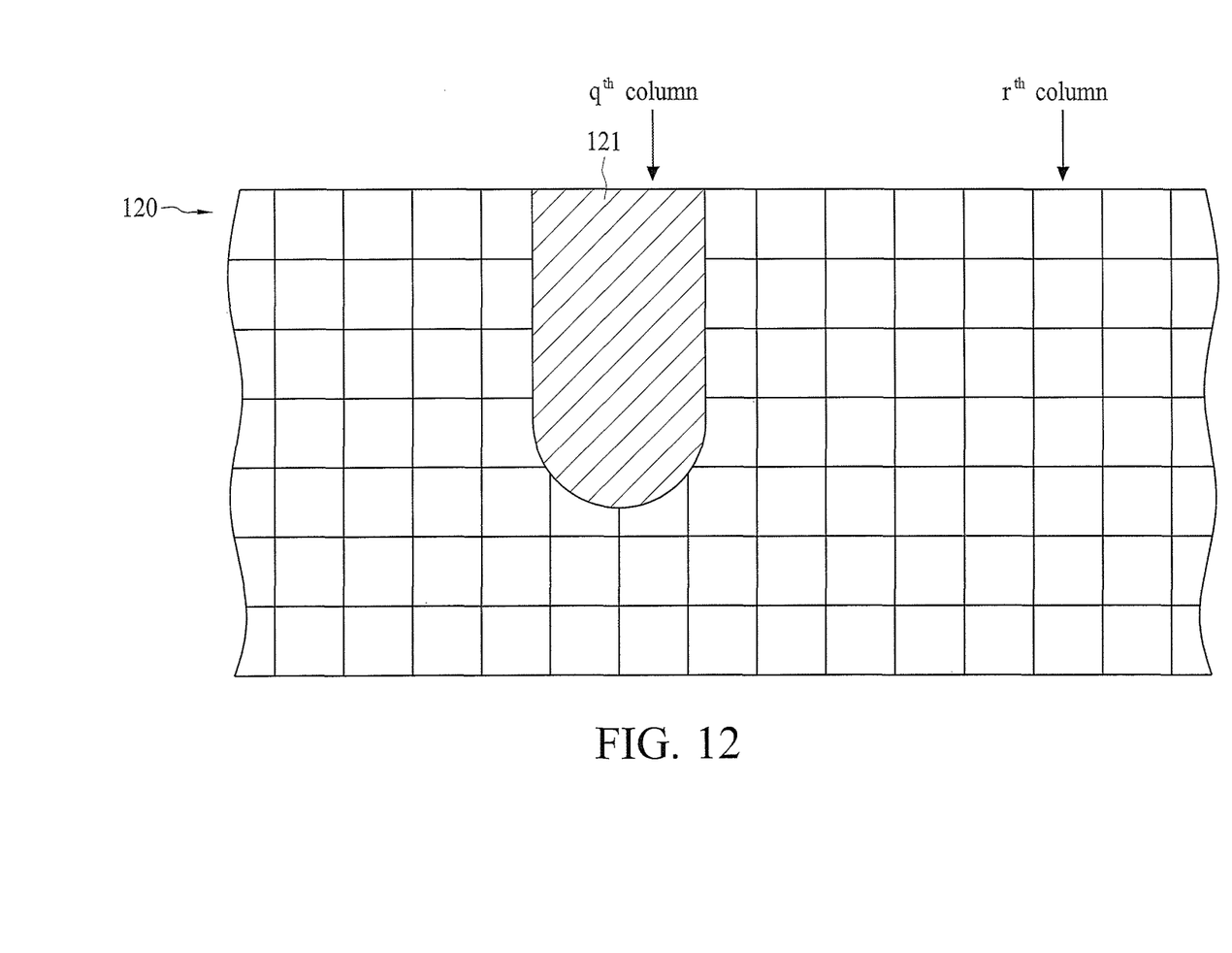
FIG. 12 schematically depicts a picture generated by the optical touch system according one embodiment of the present invention.

FIG. 12 schematically depicts a picture 120 generated by the optical touch system 1' according to one embodiment of the present invention. As shown in FIG. 11, the optical touch system 1' comprises at least one image sensor 1101, a computing device 62, and a light providing device 64. At least one image sensor 1101 may be a normal image sensor. The light providing device 64 is configured to provide light over a touch surface 61. In one embodiment, the optical touch system 1' comprises two image sensors 1101, and the light providing device 64 comprises a light source. In another embodiment of the present invention, the optical touch system 1' comprises an image sensor 1101, and the light providing device 64 comprises a mirror.

When an object 63 moves adjacent to the touch surface 61, the image sensor 1101 may generate a picture 120 as shown in FIG. 12. The computing device 62 can calculate the intensity standard deviations of all pixel columns of the picture 120 according to equation (1) as follows:

$$\sigma_n^p = \sqrt{\frac{1}{N}\sum_{i=1}^{N}(x_i^p - \bar{x}^p)^2} \quad (1)$$

where $\sigma_n^p$ represents the intensity standard deviation of the $p^{th}$ pixel column, N represents the number of pixels of the $p^{th}$ pixel column, $x_i^p$ is the intensity of the $i^{th}$ pixel of the $p^{th}$ pixel column, and $\bar{x}^p$ is the averaged intensity of the pixels of the $p^{th}$ pixel column.

After the intensity standard deviations $\sigma_n^p$ are calculated, the computing device 62 may compare the intensity standard deviation of each pixel column with a threshold value T1 to determine whether the object 63 contacts the touch surface 61. The comparison may be performed according to equation (2) as follows:

$$\text{Touch Level} = \begin{cases} 0 & \text{(Untouched), if } \sigma_n^p \leq T1 \\ 1 & \text{(Touched), if } \sigma_n^p > T1 \end{cases} \quad (2)$$

In one embodiment, the threshold value T1 can be a predetermined value.

In one embodiment, the threshold value T1 can be determined by equation (3) as follows:

$$T1 = Th2 \times \sigma_b^p \quad (3)$$

where $\sigma_b^p$ is the intensity standard deviation of the $p^{th}$ pixel column of a background picture, and the Th2 is a ratio including, for example, 0.5.

In one embodiment, as shown in FIG. 6, the computing device 62 may select at least one column or row of light detecting elements 111 corresponding to the pixels included in the image of the object 63, analyze the distribution of electronic signals generated by at least one column or row of light detecting elements 111, and compare the electronic signals with a threshold value. Since the light detecting elements 111 of each column or row are configured to generate different strengths of electronic signals under the same illumination for detecting an object, the distribution of the electronic signals generated by the light detecting elements 111 of each column or row under the same illumination will have large deviations and should be greater than the threshold. Because the object 63 blocks light, at least one column or row of light detecting elements 111 corresponding to the pixels included in the image of the object 63 generates electronic signals that will vary little so that the distribution of the electronic signals generated by at least one column or row of light detecting elements 111 will be less than the threshold value.

Referring to FIG. 12, in the picture 120, since a portion of pixels are included in the object image 121, the intensities of the portion of pixels included in the object image 121 are significantly different from those of the pixels outside the object image 121. As such, a pixel column (for example, the $q^{th}$ pixel column) that comprises the pixels forming the object image 121 may have an intensity standard deviation $\sigma_n^q$ larger than the intensity standard deviation $\sigma_n^r$ of a pixel column (for example, the $r^{th}$ pixel column) that does not include pixels forming the object image 121 or than the intensity standard deviation of a pixel column that is not included in the object image 121. Therefore, using a threshold value T1 can distinguish the pixel columns that includes pixels forming the object image 121 from other pixel columns that do not include pixels forming the object image 121, thereby determining whether there is an object 63 contacting the touch surface 61. The optical touch system 1' shown in FIG. 11 can only calculate the intensity standard deviations of a new picture, and then determine whether there is an object contacting the touch surface by a difference between the intensity standard deviations. The optical touch system 1' need not store a background picture in advance, and does not perform a subtraction of a background picture and a new picture so that the optical touch system 1' requires fewer computations.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, they perform the methods and processes included within the hardware modules.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. An image sensor comprising:
a plurality of light detecting elements arranged in a plurality of rows and a plurality of columns, wherein each column at least comprises a first light detecting element having a first effective light collecting area and a second light detecting element having a second effective light collecting area different from the first effective light collecting area, and the first light detecting element and the second light detecting element are configured to detect the same illumination of light;
wherein the image sensor generates a flat field picture comprising a plurality of pixel rows and a plurality of pixel columns; and
wherein in the flat field picture, an intensity standard deviation of pixels in each pixel column is greater than an intensity standard deviation of pixels in any pixel row.

2. The image sensor of claim 1, wherein each column of light detecting elements comprises two groups of light detecting elements having different effective light collecting areas.

3. The image sensor of claim 2, wherein the light detecting elements of the two groups are alternatively arranged.

4. The image sensor of claim 1, wherein each row or column of light detecting elements comprises two groups of light detecting elements having different exposure times.

5. The image sensor of claim 4, wherein the light detecting elements of the two groups are alternatively arranged.

6. The image sensor of claim 1, wherein each column of light detecting elements comprises two groups of light detecting elements having different quantum efficiencies or optical efficiencies.

7. The image sensor of claim 6, wherein the light detecting elements of the two groups are alternatively arranged.

8. The image sensor of claim 1, further comprising an optical component disposed on a light receiving surface of the image sensor, wherein transmittance of the optical component periodically varies in a column direction or a row direction.

9. An image sensor comprising:
a plurality of light detecting elements arranged in a plurality of rows and a plurality of columns;
wherein each column at least comprises a first light detecting element having a first effective light collecting area and a second light detecting element having a second effective light collecting area different from the first effective light collecting area, and the first light detecting element and the second light detecting element are configured to detect the same illumination of light.

10. The image sensor of claim 9, wherein each column comprises two groups of light detecting elements having different effective light collecting areas.

11. The image sensor of claim 10, wherein the light detecting elements of the two groups are alternatively arranged.

12. An optical touch system comprising:
a touch surface; and
an image sensor configured to capture an image of an object on the touch surface for calculating coordinate data of the object, the image sensor comprising a plurality of light detecting elements arranged in a plurality of rows and a plurality of columns, wherein each column at least comprises a first light detecting element having a first effective light collecting area and a second light detecting element having a second effective light collecting area different from the first effective light collecting area;
wherein an intensity standard deviation of pixels in at least one pixel column of a picture comprising the image of the object is less than the intensity standard deviation of pixels in at least one pixel column that does not comprise the image of the object.

13. The optical touch system of claim 12, wherein the intensity standard deviation of the pixels of the at least one pixel column of the picture comprising the image of the object is less than a threshold value.

14. The optical touch system of claim 13, wherein the threshold value is determined by pixels in a pixel column of a background picture.

15. The optical touch system of claim 12, further comprising a light providing device configured to provide light over the touch surface.

16. The optical touch system of claim 12, wherein the light providing device comprises a light source or a mirror.

17. An optical touch system comprising:
a touch surface;
an image sensor configured to capture an image of an object on the touch surface, the image sensor comprising a plurality of light detecting elements arranged in a plurality of rows and a plurality of columns, each light detecting element generating a signal, wherein each column at least comprises a first light detecting element having a first effective light collecting area and a second light detecting element having a second effective light collective area different from the first effective light collecting area; and
a computing device configured to determine at least one column of light detecting elements corresponding to pixels included in the image of the object, wherein a standard deviation of the signals generated by the at least one column of light detecting elements corresponding to the pixels included in the image of the object are less than a threshold value.

18. The optical touch system of claim 17, wherein the light detecting elements of each column corresponding to pixels that are not included in the image generate signals that are larger than the threshold value.

19. The optical touch system of claim 17, wherein each column of light detecting elements comprises two groups of light detecting elements having different effective light collecting areas.

20. The optical touch system of claim 17, wherein each column of light detecting elements comprises two groups of light detecting elements having different exposure times.

21. The optical touch system of claim 17, wherein each column of light detecting elements comprises two groups of light detecting elements having different quantum efficiencies or optical efficiencies.

22. The optical touch system of claim 17, further comprising an optical component disposed on a light receiving surface of the image sensor, wherein transmittance of the optical component periodically varies in parallel to an arrangement direction of one of the columns of light detecting elements.

* * * * *